United States Patent
Mellado et al.

(10) Patent No.: US 6,732,760 B2
(45) Date of Patent: May 11, 2004

(54) FLUID DISTRIBUTOR VALVE OUTLET OPENING AND CLOSING DEVICE

(75) Inventors: Rafael Ruiz Mellado, Saint Jaume de Llierca (ES); Emilio Serrano Sanchez, Sant Jaume de Llierca (ES)

(73) Assignee: Sacopa, S.A.U., Sant Jaume de Llierca (ES)

( * ) Notice: Subject to any disclaimer, the term of this patent is extended or adjusted under 35 U.S.C. 154(b) by 0 days.

(21) Appl. No.: 10/379,086

(22) Filed: Mar. 4, 2003

(65) Prior Publication Data

US 2003/0172977 A1 Sep. 18, 2003

(30) Foreign Application Priority Data

Mar. 13, 2002 (ES) ........................................ 200200626 U

(51) Int. Cl.[7] ............................................... F16K 11/14
(52) U.S. Cl. ............................ 137/624.18; 137/624.14; 137/119.07; 137/627
(58) Field of Search ...................... 137/624.14, 119.07, 137/627, 624.18

(56) References Cited

U.S. PATENT DOCUMENTS 4,077,424 A  *  3/1978  Ehret et al. ......... 137/624.11 X
6,325,087 B1  *  12/2001  Tarr ................... 137/624.14 X

* cited by examiner

Primary Examiner—Kevin Lee
(74) Attorney, Agent, or Firm—Steinberg & Raskin, P.C.

(57) ABSTRACT

This device comprises a body (2) having outlets (8), and a bonnet (3) housing a rotor (6) being submitted to the action of the inflowing fluid and being connected to a reducing gear (15) activating the closing device. This device is characterized in that the opening of the outlets (8) is carried out with respective angularly sliding shutters (9) being turned by means successively shifting them in opposite directions to thus respectively obtain the opening and closing of the outlets (8). The means shifting the shutters (9) are made up by studs (12, 13 and 14) being provided on the lower surface of the rotary intermediary plate (4) being solid with the reducing gear (15).

9 Claims, 2 Drawing Sheets

FLUID DISTRIBUTOR VALVE OUTLET OPENING AND CLOSING DEVICE

FIELD OF THE INVENTION

The invention relates to a fluid distributor valve outlet opening and closing device.

BACKGROUND OF THE INVENTION

Distributor valves are already known which are preferably applied in connection with swimming pool bottom flushing devices and comprise a chamber being made up between a body and a bonnet, said body having a water inlet port and several water outlets comprising closure members being actuated by means of a reducing gear acting by virtue of the action of the inflowing water on a rotor cooperating with said gear.

The device being the object of this invention is applicable to different models of valves of the above-mentioned type but more particularly consists in an improvement on the valve being the object of the Spanish Utility Model no. 200000421 (ES-1045405) of the very Applicant, said valve comprising a central device by means of which the passage of water towards the rotor as well as its total obturation are controlled in order to adjust the opening time for each outlet as well as the time during which a given outlet will remain open and all the other outlets will remain closed in the valve passage.

In said Model no. 200000421 the closures of the fluid outlets were made up by respective flaps being hinged at one end and being raised at the opposite end by means of a ramp being provided on the inside of the bottom edge of the periphery of the intermediary plate, this latter having fitted on its top surface the reducing gear and being rotated by virtue of the meshing of the reducing gear with an internal gear rim being provided on the inner periphery of the bonnet.

BRIEF SUMMARY OF THE INVENTION

The device being the object of this invention notably improves the opening and closing means for said water outlets thereby reducing the force being needed to actuate each shutter and using very simplified means.

The means being used to join and lock together the body and bonnet have also been simplified and improved since instead of for such a purpose using a bayonet lock needing a safety catch a clasp is now used which clasps the respective peripheral flanges being provided at the mutually opposite openings of said body and bonnet.

This device is characterized in that said water outlets are opened and closed with respective shutters being angularly slidable and being turned by means successively shifting them in opposite directions in order to thus respectively obtain the opening and closure of said outlets, said means being made up by studs being provided on the lower surface of the intermediary plate.

In the direction of rotation of the intermediary plate one of said studs is a leading stud and pushes the shutter open whereas the other stud being arranged at a trailing position pushes the shutter closed, the stud-driven edge of the shutter being shaped with an angular configuration, said studs respectively acting on one and on the other of the sides forming said angular configuration.

BRIEF DESCRIPTION OF THE DRAWINGS

These and other characteristics will be best made apparent by the following detailed description whose understanding will be made easier by the accompanying two sheets of drawings showing a practical embodiment cited only by way of example not limiting the scope of the present invention.

In the drawings.

DETAILED DESCRIPTION OF THE INVENTION

Figure 1:
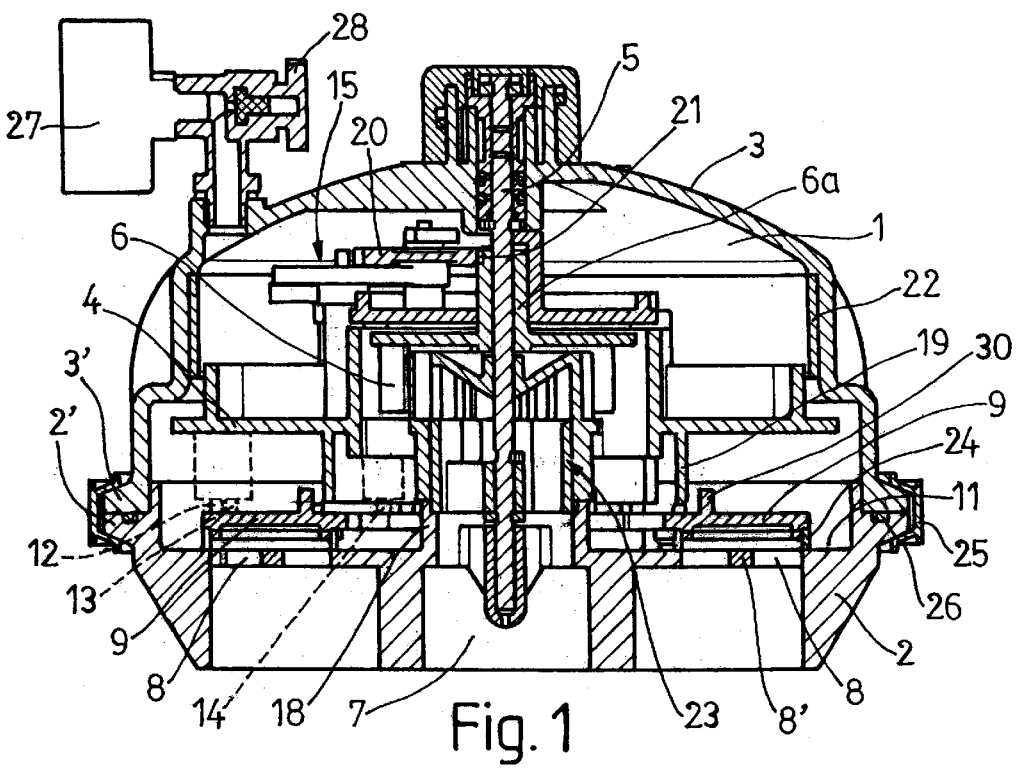
FIG. 1 is a sectional elevation of the assembly forming a distributor valve comprising the device being the object of this invention.
Figure 2:
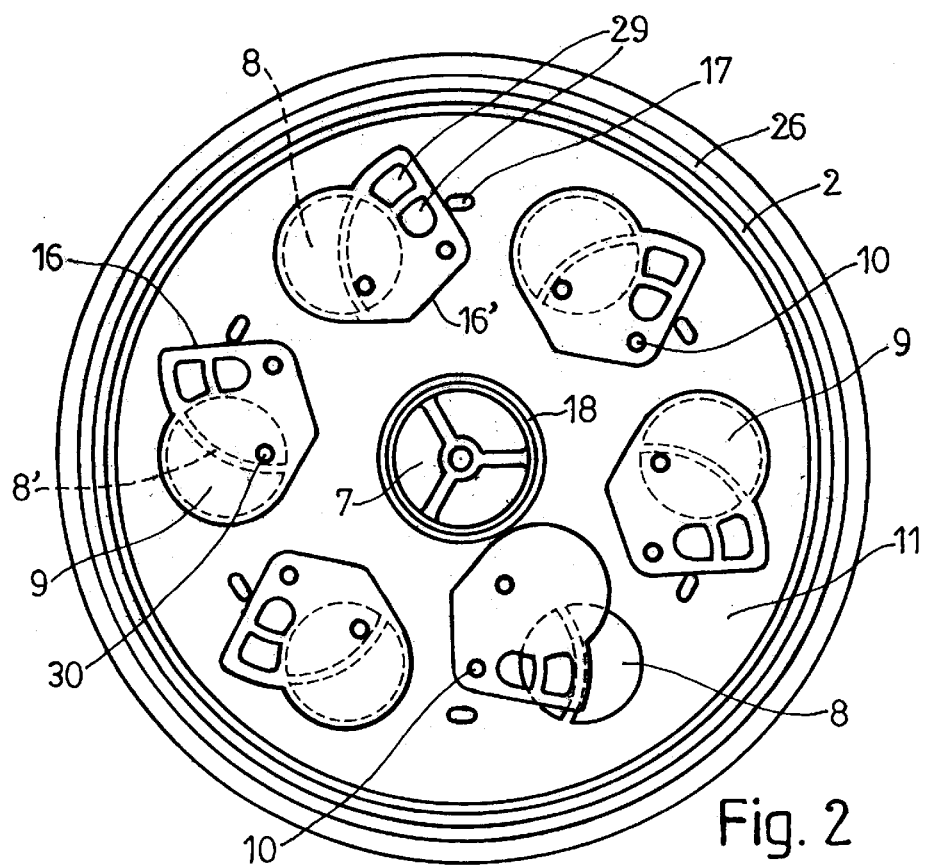
FIG. 2 is a plan-view of the valve body.
Figure 3:
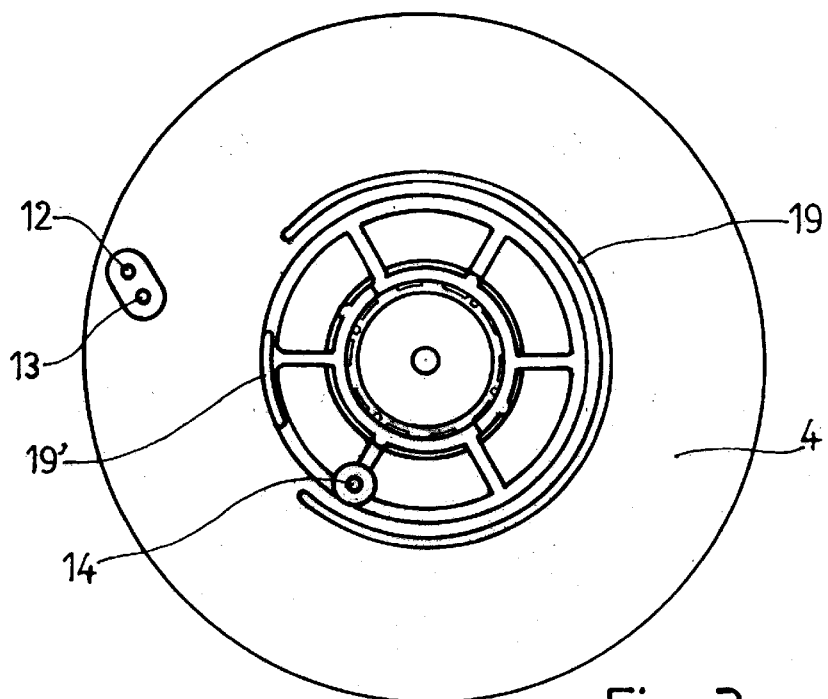
FIG. 3 shows a bottom plan-view of the intermediary plate.
Figure 4:
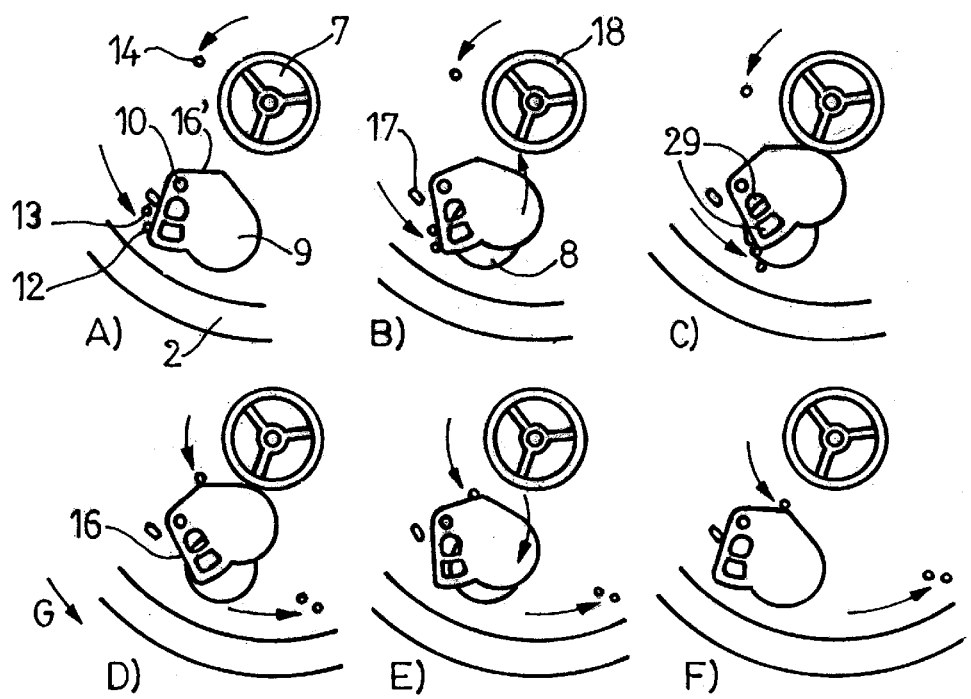
FIG. 4 in a plan-view diagrammatically illustrates the different stages in the operation of the device in question.

According to the drawings the device being the object of the invention is applied to a distributor valve having a chamber 1 being formed by a circular base body 2 being closed by means of a dome-shaped bonnet 3, an intermediary plate 4 being rotatably fitted in said chamber and surrounding an upright central shaft 5 being also surrounded by a freely rotatable rotor 6 being driven by virtue of the action of the water flowing into the valve through a bottom port 7 being centrally provided in body 2, this latter being provided around said port with water outlets 8 being closed by closures being made up by respective shutters 9 being angularly slidable around a pin 10 being secured onto the upper surface 11 of body 2.

Said shutters are turned by being actuated by means successively shifting them in opposite directions to thus respectively obtain the opening and closure of the outlets 8, said means being made up by studs 12, 13 and 14 being provided on the lower surface of the intermediary plate 4 being solid with the reducing gear 15. In the direction of rotation G of the plate 4 the studs 12 and 13 of said studs are leading studs and push the shutter 9 open, stud 12 being more distant from the shutter swivel pin 10 being the one acting in the first place, whereas the stud 14 being arranged at a trailing position pushes the shutter closed. The stud-driven edge of the shutters is shaped with an angular configuration, studs 12 and 13 acting on one (16) of the sides of said angular configuration whereas stud 14 acts on the other side 16'.

The angular shift of the shutters 9 is restricted in both directions by a stop 17 being provided on the body 2 and by a neck 18 of said body being coaxial with the bottom port 7, respectively. The intermediary plate 4 is provided on its lower surface with an also coaxial collar extending on top of the shutters 9 to thus prevent them from rising.

This collar is formed by two lengths 19 and 19' being separated from each other and also has the function of guiding the shutters by acting on the stud 30 being provided on their upper surface. The action of the collar on the studs 30 assures at all times that all of the outlets 8 but one will be closed. The first toothed wheel 20 of the reducing gear 15 meshes with a pinion 21 being formed at the upper end of a tubular shaft 6a of the rotor 6, whereas the last wheel (not shown) of said gear meshes with a ring gear 22 being provided at the inner periphery of the bonnet 3.

The above-mentioned valve comprises a central device 23 by means of which the passage of water from the bottom port 7 towards the rotor 6 is controlled and can even be totally shut off if desired in order to thus adjust the opening time for the shutters 9, and also in order to stabilize the opening of only one of these shutters when arresting the valve.

In order to facilitate the sliding of the shutters 9 on the body 2 the lower edge of said shutters comprises a low-friction bushing 24.

The body 2 and the bonnet 3 are joined and locked together by means of a clasp 25 clasping the respective flanges 2' and 3' being provided at the periphery of the mutually opposite openings of said body and bonnet, an O-ring 26 being provided between said flanges.

Numeral 27 indicates the presence of a pressure gage, and numeral 28 indicates the viewer bleed screw.

The water outlets 8 have a transversal tab 8' facilitating the proper sliding of the shutters 9 on said outlets, said shutters having in the vicinity of their side 16 windows 29 aiding the passage of water towards the outlets 8 when the shutters are opened.

The invention can within its essentiality be put into practice in other embodiments only in detail differing from the one having been described above only by way of example, said other embodiments also falling within the scope of the protection being sought.

What is claimed is:

1. A device for opening and closing outlets of a fluid distributor valve wherein said fluid distributor valve comprises a body (2) having outlets (8), and a bonnet (3) housing a rotor (6) having submitted to the action of the inflowing fluid and being connected to a reducing gear (15) activating the closing device; wherein the opening of said outlets (8) is carried out with respective angularly sliding shutters (9) being turned by means successively shifting them in opposite directions to thus respectively obtain the opening and closing of said outlets (8).

2. A device as per claim 1, wherein the means shifting the shutters (9) are made up by studs (12, 13 and 14) being provided on the lower surface of a rotary intermediary plate (4) being solid with the reducing gear (15).

3. A device as per claim 2, wherein in the direction of rotation of the intermediary plate (4) one (12) of said studs is a leading stud and pushes the shutter (9) open whereas the other stud (14) being arranged at a trailing position pushes the shutter (9) closed.

4. A device as per claim 2, wherein the edge of the shutter (9) being driven by said studs (12, 13 and 14) is shaped with an angular configuration, said studs respectively acting on one (16) and on the other 16') of the sides forming said angular configuration.

5. A device as per claim 1, wherein the valve body (2) on which the shutters (9) slide is provided with stops (17 and 18) restricting the angular shift of said shutters in opposite directions.

6. A device as per claim 3, wherein the leading stud is a double stud (12 and 13), the stud (12) being more distant from the pin (10) embodying a swiveling axis for the shutters (9) being the one acting in the first place.

7. A device as per claim 1, wherein at their mutually opposite openings the body (2) and a bonnet (3) are provided with respective peripheral flanges (2' and 3') being clasped by a clasp (25) joining said body and bonnet together.

8. A device as per claim 1, wherein an intermediary plate (4) is provided on its lower surface with a collar being formed by two lengths (19 and 19') and extending on top of the shutters (9) to thus prevent them from rising, said collar guiding said shutters by acting on an upper stud (30) being provided on them, the action of the collar on said stud (30) assuring that all of the outlets (8) but one will be closed.

9. A device as per claim 1, wherein a low-friction bushing is fitted to the lower edge of the shutters (9) and thus facilitates the sliding of said shutters on the body (2).

\* \* \* \* \*